United States Patent [19]

Louboutin et al.

[11] 4,136,012

[45] Jan. 23, 1979

[54] COMPACT APPARATUS FOR THE PURIFICATION OF WASTE WATER BY A PHYSICAL CHEMICAL TREATMENT

[75] Inventors: Robert Louboutin, La Celle-Saint-Cloud; Vincent Savall, Velizy, both of France

[73] Assignee: Degremont, Rueil-Malmaison, France

[21] Appl. No.: 829,095

[22] Filed: Aug. 30, 1977

[30] Foreign Application Priority Data

Sep. 17, 1976 [FR] France .................................. 76 27958

[51] Int. Cl.² .................................................. B01D 21/08
[52] U.S. Cl. ........................................... 210/208; 210/521
[58] Field of Search ................... 210/49, 51, 96, 260, 210/259, 319, 320, 521, 522, 532, 534, 536, 195, 208

[56] References Cited

U.S. PATENT DOCUMENTS

| | | | |
|---|---|---|---|
| 2,391,697 | 12/1945 | Green | 210/208 X |
| 2,852,140 | 9/1958 | MacLaren | 210/195 UX |
| 3,393,149 | 7/1968 | Conley et al. | 210/96 |
| 3,706,384 | 12/1972 | Wegman-Hane | 210/522 |
| 3,779,910 | 12/1973 | Charfield | 210/195 S |
| 3,833,122 | 9/1974 | Cock | 210/207 |
| 3,963,624 | 6/1976 | Henderson et al. | 210/532 R |
| 3,975,276 | 8/1976 | Schmid | 210/521 |

*Primary Examiner*—Theodore A. Granger
*Attorney, Agent, or Firm*—Wenderoth, Lind & Ponack

[57] ABSTRACT

A single, integrally formed tank has an upper portion of a rectangular configuration and a lower portion of downwardly decreasing volume and defined by a plurality of exterior walls, at least two of which are inclined downwardly and inwardly toward each other. The interior of the tank is divided into three serially connected compartments by means of interior walls which are inclined in directions substantially parallel to one of the inclined exterior walls. The compartments thus formed are a first, neutralization and coagulation compartment, a second, flocculation compartment, and a third, lamellar decanting and sludge settling compartment. Within the flocculation compartment are arranged a plurality of spaced inclined plates defining upwardly inclined flow passages into which extend deflectors to create eddy currents in the water passing upwardly through the flocculation compartment. Within the decanting compartment are arranged a plurality of inclined hollow tubes which facilitate downward settling of sludge and upward movement of the decanted water.

17 Claims, 1 Drawing Figure

U.S. Patent Jan. 23, 1979 4,136,012
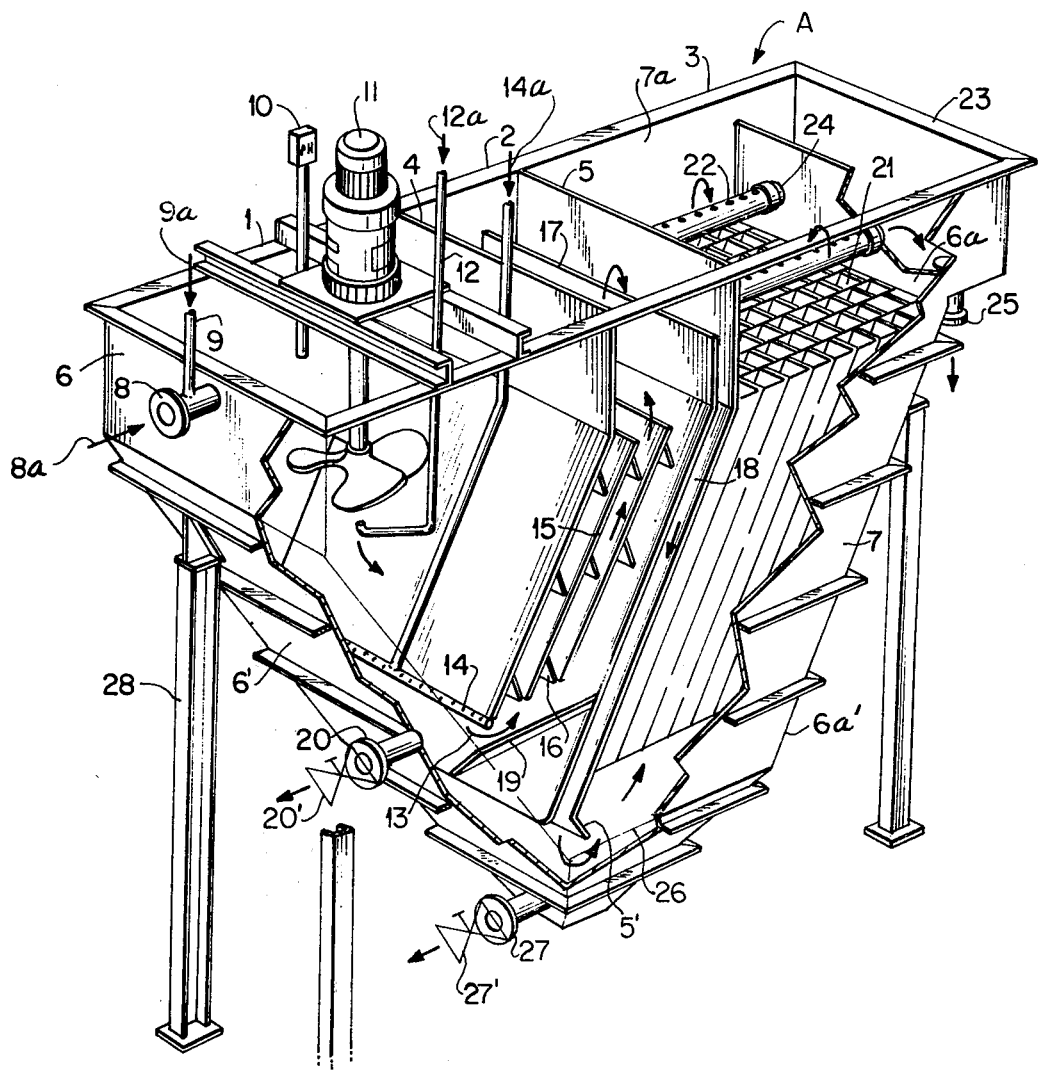

4,136,012

COMPACT APPARATUS FOR THE PURIFICATION OF WASTE WATER BY A PHYSICAL CHEMICAL TREATMENT

BACKGROUND OF THE INVENTION

The present invention relates to an apparatus for purifying urban and industrial waste water by means of physical chemical treatment. More particularly, the present invention relates to such an apparatus in the configuration of a compact or integral unit containing therein serially connected compartments for neutralization and coagulation, for flocculation, and for lamellar decanting of the treated liquid and thickening of the sludge.

In most previously known systems for the physical chemical purification of waste water, for example sewage, the operations of neutralization and coagulation, of flocculation, and of decanting are performed in separate units. Such systems are inherently expensive to construct and maintain the furthermore occupy a considerable amount of space.

Accordingly, there have been prior art attempts to design an apparatus which is more compact by combining various of the above individual units into a single apparatus. However, such prior art attempts to construct a compact apparatus employing physical chemical treatment methods have so far met with only limited success. Specifically, such known compact systems are generally employable only for the physical chemical treatment of river water to obtain drinking water. That is, such known systems are in actual practice suitable only for treating water which is relatively unpolluted. Such known systems do not allow for the evacuation of heavy substances, such as sand and other materials suspended in the water to be treated. This is manifestly disadvantageous in the treatment of heavily polluted water such as urban and industrial waste water. Furthermore, evacuation of sludge from such known systems can only be achieved by periodically stopping the operation of the entire apparatus.

SUMMARY OF THE INVENTION

With the above discussion in mind, it is the primary object of the present invention to provide a compact apparatus including a single integral unit including adjacent serially connected compartments for the full and complete purification of urban and industrial waste water by physical chemical means.

A further object of the present invention is to provide such an integral apparatus including serially connected compartments for a neutralization and coagulation treatment, a flocculation treatment, and a lamellar decanting treatment.

An even further object of the present invention is to provide such an apparatus which completely eliminates the disadvantages of prior art systems and which makes it possible to purify heavily polluted water such as urban and industrial waste water, i.e. water which is much more polluted than normal river water, by the physical chemical treatment method.

It is a yet further object of the present invention to provide such an apparatus which is capable of purifying heavily polluted water to the presently required legal standards.

It is a yet even further object of the present invention to provide such an apparatus wherein large amounts of sludge are readily formed and easily evacuated without the necessity of stopping the operation of the apparatus.

It is a still even further object of the present invention to provide such an apparatus which is capable of treating heavily polluted water at rates of from one to fifty cubic meters per hour.

It is a final specific object of the present invention to provide such an apparatus which is easy to use, which occupies a relatively small amount of space, and which may be readily modified to varying quality and capacity treatment requirements.

The above objects are achieved in accordance with the present invention by the provision of a physical chemical water purification treatment system including an integral single housing or tank having an upper portion of a rectangular configuration and a lower portion having a configuration similar to that of a truncated inverted pyramid. Specifically, the lower portion of the tank is defined by a first pair of parallel opposite walls and by a second pair of opposite walls which incline downwardly toward each other. The upper portion of the tank is formed by two pairs of opposite spaced parallel walls. The interior of the tank is divided into three serially connected compartments for performing the complete physical chemical treatment operation necessary for the purification of the specific waste water to be treated. Specifically, the interior of the tank includes a first compartment for a neutralization and coagulation treatment, a second compartment for a flocculation treatment and wherein there occurs separation of heavy flocculated substances, and a third compartment for lamellar decanting of the treated liquid and for thickening of the sludge. The bottoms of the first and second compartments are in communication and form a first sludge pit from which are evacuated heavy substances and particles and sludge. The first and second compartments are separated by an inclined wall which preferably may be parallel to one of the inclined opposite walls of the tank. The top of the second compartment connects with the bottom of the third compartment via a duct formed by further walls which preferably are parallel to the first wall. Beneath the third compartment is provided a second sludge removal pit which preferably may be defined by four downwardly and inwardly inclined walls, thereby inherently facilitating concentration of sludge. Sludge may be removed by gravity from both of the first and second sludge removal pits.

Within the second compartment are removably positioned a plurality of inclined plates which may have depending from the under inclined surfaces thereof baffle plates. This arrangement allows for the creation of eddy currents of the liquid flowing upwardly through the second compartment, thereby facilitating and improving flocculation.

Within the third compartment are arranged a plurality of preferably inclined tubes to facilitate lamellar decanting of the liquid flowing upwardly through the third compartment. Preferably the cross-sectional configuration of the inclined tubes is polygonal.

The inclined plates and baffle plates in the second compartment and the inclined tubes in the third compartment are arranged to be readily removed through the upper portion of the tank. Sludge evacuation pipes extend from the first and second sludge pits.

BRIEF DESCRIPTION OF THE DRAWING

Other objects, features and advantages of the present invention will be apparent from the following detailed description taken with the accompanying drawing, wherein the single FIGURE is a perspective view, with portions thereof broken away, of the integral compact physical chemical treatment apparatus of the present invention.

DETAILED DESCRIPTION OF THE INVENTION

With reference now to the drawing, the compact physical chemical water purification apparatus of the present invention includes a single, unitary tank A including a first pair of spaced, parallel and substantially vertical walls 7 and 7a. An upper portion of the tank A has a rectangular configuration including a second pair of spaced, parallel and substantially vertical walls 6 and 6a each joined at opposite ends thereof to walls 7 and 7a. The tank A also includes a lower portion having a configuration similar to that of a truncated inverted pyramid and including opposite walls 6' and 6a' which extend downwardly and inwardly in an inclined manner from vertical walls 6 and 6a, respectively, and which are joined to walls 7 and 7a. The various above described walls are liquid tightly joined or integrally formed to define the tank A.

The interior of tank A is divided into three compartments, i.e. neutralization and coagulation compartment 1, flocculation compartment 2, and lamellar decanting compartment 3. Compartments 1 and 2 are separated by a wall 4 the opposite lateral edges of which are liquid tightly attached or formed integrally with walls 7 and 7a. Wall 4 forms a first intermediate wall which has an upper portion preferably extending parallel to walls 6 and 6a and a lower portion which is inclined, preferably in a direction parallel to wall 6a'. The bottoms of compartments 1 and 2 are defined by two inclined plates 19 fixed upon walls 7, 7a and forming with wall 6' and the lower part of wall 17 a configuration similar to that of an inverted pyramid, in order to form a first sludge pit. The wall 4 is such that the bottom of compartments 1 and 2 are in fluid communication.

Compartments 2 and 3 are separated by a duct 18 which is defined by walls 17 and 5. Wall 17 has an upper portion which preferably extends parallel to walls 6 and 6a and a lower portion which extends in an inclined manner, preferably parallel to wall 6a'. The upper edge of wall 17 is designed to be below the level of fluid within compartment 2. Wall 5 includes an upper portion which preferably extends parallel to walls 6 and 6a and a lower portion which extends in an inclined manner, preferably in a direction parallel to wall 6a'. Thus, liquid within compartment 2 flows over the upper edge of wall 17 into inclined duct 18 without dropping over edge 17. This has the advantage of avoiding turbulence which would be capable of breaking up the floc formed in compartment 2. The opposite lateral edges of walls 17 and 5 are liquid tightly connected to or integrally formed with walls 7 and 7a. The lower edge 5' of wall 5 is bent inwardly toward compartment 3 to prevent backflow of sludge from the bottom portion of compartment 3 back into duct 18. Preferably, lower edge 5' extends in a direction substantially parallel to wall 6'. The lower portion 26 of compartment 3 forms a second sludge pit wherein is concentrated sludge which settles out from the liquid within compartment 3. Second sludge pit 26, in a particularly preferred form of the invention illustrated in the drawing, may be defined by four inwardly and downwardly inclined walls in the form of an inverted pyramid. This pyramidal configuration facilitates the concentration and evacuation of sludge from second sludge pit 26.

Waste water to be treated is introduced into the upper portion of compartment 1 through inlet pipe 8 as indicated by arrow 8a. A suitable alkaline or acid reagent is added to the incoming waste water via line 9 as indicated by arrow 9a to achieve a desired pH, e.g. substantial neutralization, of the incoming waste water. A pH detector or regulator 10 may be provided in compartment 1. Device 10 may be a pH detector to measure the pH of the liquid within compartment 1 so that the reagent entering line 9 may be adjusted to control the neutralization of the pH of the waste water. Alternatively, device 10 may be a combined pH detector and regulator which automatically regulates the amount of reagent added through line 9, thereby automatically controlling the neutralization of the incoming waste water. The incoming waste water within compartment 1 is agitated by a conventional agitator 11, and a coagulation reagent suitable for the particular waste water involved is added beneath the agitator 11 via pipe 12 as indicated by arrow 12a. It is specifically to be understood that the particular type of pH device 10 and agitator 11 employed do not in and of themselves constitute the present invention. Such devices are known in the art and would readily be understood by those knowledgeable in the art. Accordingly, such devices will not be further described herein. It is to be further understood that the particular pH control reagent added through line 9 and the particular coagulation reagent added through line 12 would vary dependent upon the particular characteristics of the incoming waste water to be treated. Such reagents are well known in the art, and thus one conversant in the art would readily understand what reagents to be added. Such reagents are therefore not further discussed herein.

The water to be treated thus has the pH thereof controlled and is coagulated within compartment 1. From the lower portion of compartment 1 the treated water passes naturally and with a negligible loss of pressure beneath the bottom edge of wall 4 into the bottom of flocculation compartment 2, as indicated by arrow 13. A flocculation reagent, suitable for the particular waste water being treated, is distributed to the water via a distributor 14 arranged beneath the lower edge of wall 4, as indicated by arrow 14a. Distributor 14 extends along the entire width of the tank. It is to be understood that the particular flocculation reagent added would depend on the characteristics of the water undergoing treatment. The particular flocculation reagent added does not in and of itself form any portion of the present invention. Such flocculation reagents are known in the art, and one conversant in the art would readily understand what flocculation reagents should be added to a given waste water being treated. Such flocculation reagents will therefore not be further discussed herein.

The water to be treated, having the flocculation reagent added thereto, passes upwardly through compartment 2, between walls 4 and 17, while flocculation is effected. A plurality of inclined plates 15, preferably inclined to be parallel to the lower inclined portions of walls 4 and 17, are positioned within compartment 2 between walls 4 and 17, thereby forming inclined flocculation passages. The upper side of each such inclined flocculation passage is penetrated by a plurality of deflector plates 16. Specifically, the underside of the lower portion of wall 4 has located thereon a plurality of deflector plates 16. The lower side of each inclined plate 15 also has thereon a plurality of deflector plates 16. Thus, in the specific embodiment illustrated in the drawing, there occurs flow in an upwardly inclined direction between wall 4 and the leftmost plate 15. There is also flow between the two plates 15. Finally, there is flow between the rightmost plate 15 and wall 17. The provision of deflector plates 16 creates eddy currents which achieve dissipation of energy which in turn facilitates flocculation within compartment 2.

In accordance with a particularly advantageous feature of the present invention, one or more of the inclined plates 15 with the deflectors 16 attached thereto may be removed through the upper portion of compartment 2. This allows the value of the dissipated energy to be modified dependent upon the quality of the water to be treated. Similarly, additional inclined plates 15 with deflectors 16 attached thereto could be added. It is to be understood that if plates 15 and attached deflectors 16 are added or removed, the spacing of the plates would be adjusted to ensure equal spacing between the plates, i.e. to ensure equal dimensions of the resulting inclined flocculation passages.

Sludge produced and relatively heavy particles capable of settling will accumulate in the first sludge pit defined by bottom plate 19. Removal of such sludge and particles may be achieved through a suitably located pipe 20, for example through a valve 20'.

The water undergoing treatment and having therein flocculated particles passes over the upper edge of wall 17 into inclined duct 18 and passes downwardly therethrough and under lower edge 5' into the bottom of compartment 3. Due to the fact that the upper edge of wall 17 is always located beneath the upper level of liquid within compartment 2, the flow of liquid into duct 18 will be at a steady rate without dropping over the upper edge of wall 17. This avoids the formation of turbulence which would break up the formed floc. The liquid passes in an upwardly inclined manner through compartment 3 whereby the floc settles out as sludge and the water is decanted. Specifically, water decantation and sludge settling is of the lamellar type and is achieved by the provision of a plurality of inclined tubes 21 located within compartment 3 and preferably extending in directions parallel to wall 6a'. The sludge settling downwardly in compartment 3 is collected in the pyramidal shaped second sludge pit 26 and is removed via pipe 27 which may be equipped with a valve 27'. The decanted liquid is removed from compartment 3 by means of at least one perforate collector 22 extending across the upper portion of compartment 3. Preferably, more than one collector 22 are provided. The collectors 22 deposit the decanted water into a collecting chamber or spout 23, from which the collected decanted water is removed, for example via a pipe 25. The loss of pressure occurring through passage of the decanted water through the perforations in the collectors 22 results in a homogeneous distribution of water flow through the entire portion of compartment 3 and a uniform speed of movement of the water upwardly through inclined tubes 21.

In accordance with a particularly advantageous feature of the present invention collectors 22 are mounted in a readily dismountable manner by means of conventional quick-coupling joints 24. Accordingly, collectors 22 may be readily detached or removed. In accordance with a further advantageous feature of the present invention a plurality of the tubes 21 may be joined so that a large number of tubes may be readily removed through the upper portion of compartment 3, after removal of collector tubes 22. Thus, the tubes 21 can be easily and quickly removed and replaced by other, for example differently configured, inclined tubes. The tubes 21, for example formed as units including plural passages are preferably formed of a light material so that they may be readily withdrawn, and may be readily positioned within compartment 3 by resting on suitable stops (not shown in the drawing).

The cross-sectional configuration of tubes 21 is preferably polygonal, and in the illustrated embodiment is substantially square. In a specific embodiment, the cross-sectional configuration of tubes 21 is of a square having a side of from 80 to 100 mm, and the tubes are made of a relatively lightweight plastic material. It is however to be understood that such characteristics are exemplary only and are not intended to be limiting. The inclination of tubes 21 is, in accordance with a specific embodiment of the present invention, approximately 55 to 60° to the horizontal. It has been found that this inclination achieves a maximized sludge settling and a countercurrent upwardly inclined water flow.

A particularly advantageous feature of the above described construction of the present invention is that sludge and relatively heavy particles formed in compartments 1 and 2 become concentrated in the first sludge pit and thus may be withdrawn merely by gravity. This is due to the downwardly narrowing dimensions of the first sludge pit. Similarly, the sludge which settles and concentrates in the second sludge pit 26 may be easily and simply withdrawn by gravity. This feature is even further emphasized when sludge pit 26 is defined by the four downwardly and inwardly inclined walls illustrated in the drawing. Thus, the evacuation of sludge from the first and second sludge pits may be achieved substantially by gravity without the necessity of complex and costly devices such as pumps, siphons and the like.

In a specific arrangement of the present invention, the tank A is formed entirely of metal, preferably steel, and is mounted on metal supports 28. The connections of various walls 4, 5, 6, 6a, 6', 6a', 7, 7a, 17 and 19 are achieved by welding. The plates 15 and deflectors 16 are positioned to be easily and readily removable through the upper portion of compartment 2. The collector tubes 22 are mounted by quick-coupling devices 24 and are thus readily removable, whereby inclined tubes 21 are thus also readily removable. However, it is contemplated that in other specific arrangements of the present invention, the tank A may be made of a plastic, concrete or other suitable material.

Due to the above described structural arrangement of the present invention, the apparatus may be employed for water treatment flow rates of from one to fifty cubic meters per hour. Therefore, even though the device is extremely compact and is simple and inexpensive to construct, it is capable of extremely widely varying treatment capacities. A further very important advantage of the present invention is that the apparatus may be adapted to a particular water flow treatment rate or to a particular quality of water to be treated by altering the number of plates 15 and deflectors 16 in the flocculation compartment 2 and/or the tubes 21 in decanting compartment 3. Such variation or modification may be readily and easily achieved without extended downtime of the apparatus. When the plates 15 and tubes 21 are made of a relatively light material, such as plastic, it is an extremely easy and simple operation to adapt the apparatus to greatly varying water quality and treatment flow conditions.

It is to be understood that various modifications may be made to the above specifically described structural arrangements without departing from the scope of the present invention.

What is claimed is:

1. An apparatus for the purification of waste water by a physical chemical treatment, said apparatus comprising:
    a single, integrally formed tank having a lower portion of downwardly descending volume defined by a plurality of exterior walls, at least two opposite of said exterior walls being inclined downwardly and inwardly toward each other;
    the interior of said tank being divided into first, second and third serially connected compartments, said first and second compartments being in communication at the bottoms thereof, and means for communicating the top of said second compartment with the bottom of said third compartment;
    means for introducing waste water to be treated into the top of said first compartment, such that said waste water flows downwardly through said first compartment, then from the bottom of said first compartment into the bottom of said second compartment and upwardly through said second compartment, and then from the top of said second compartment through said communicating means into the bottom of said third compartment and upwardly through said third compartment;
    a plurality of inclined plates positioned within said second compartment to define therein a plurality of upwardly inclined flow passages having bottom inlet ends in communication with the bottom of said first compartment, whereby said waste water flows through said upwardly inclined flow passages;
    a plurality of deflectors extending into each of said upwardly inclined flow passages for creating turbulence in the flow of said waste water passing therethrough;
    a plurality of inclined hollow tubes positioned within said third compartment and having bottom inlet ends in fluid communication with the top of said second compartment through said communicating means; and
    means for collecting purified water from the top of said third compartment, and outlet means in communication with said collecting means.

2. An apparatus as claimed in claim 1, wherein said first compartment comprises a coagulation compartment, said second compartment comprises a flocculation compartment, and said third compartment comprises a water lamellar decanting and sludge settling compartment, and further comprising means for causing coagulation of said waste water within said first compartment, means for adding a flocculation reagent to said waste water so that floc is formed in said second compartment, said inclined hollow tubes comprising lamellar means for decanting water rising through said third compartment and for concentrating sludge settling downwardly through said third compartment.

3. An apparatus as claimed in claim 1, wherein said tank has an upper portion of substantially rectangular configuration formed by a first pair of spaced parallel walls and a second pair of spaced parallel walls, said second walls being perpendicular to and joined with said first walls.

4. An apparatus as claimed in claim 3, wherein said lower portion of said tank is formed by said first pair of spaced parallel walls and by a third pair of spaced walls extending downwardly from said second walls in an inwardly inclined manner.

5. An apparatus as claimed in claim 1, wherein said inclined plates and inclined hollow tubes extend in directions substantially parallel with one of said inclined exterior walls.

6. An apparatus as claimed in claim 1, further comprising a first sludge pit beneath and communicating with said first and second compartments, and means for removing substantially by gravity particles and heavy substances accumulating in said first sludge pit.

7. An apparatus as claimed in claim 6, further comprising a second sludge pit beneath and communicating with said third compartment, said second sludge pit being separate from said first sludge pit, and means for removing substantially by gravity sludge accumulating in said second sludge pit.

8. An apparatus as claimed in claim 7, wherein said second sludge pit is formed by four downwardly and inwardly inclined walls and has the configuration of an inverted pyramid.

9. An apparatus as claimed in claim 1, wherein said inclined plates and said inclined hollow tubes are inclined to the horizontal at an angle of approximately 55 to 60°.

10. An apparatus as claimed in claim 1, wherein said inclined plates and inclined hollow tubes are mounted for removal in an upward direction through the top of said tank.

11. An apparatus as claimed in claim 1, wherein said tank is formed of a metal material, and said inclined plates and inclined hollow tubes are formed of a plastic material.

12. An apparatus as claimed in claim 1, wherein said inclined hollow tubes have a rectangular configuration.

13. An apparatus as claimed in claim 1, further comprising a first interior wall separating said first and second compartments, said first interior wall having a portion inclined in a direction substantially parallel with one of said inclined exterior walls.

14. An apparatus as claimed in claim 13, further comprising a flocculation reagent distributor positioned beneath the lower edge of said first interior wall and extending across the entire interior width of said tank.

15. An apparatus as claimed in claim 13, further comprising second and third interior walls separating said second and third compartments, said second and third interior walls each having portions inclined in directions substantially parallel with one of said inclined exterior walls, said second and third interior walls being spaced and defining therebetween an inclined duct extending from the top of said second compartment to the bottom of said third compartment, said inclined duct comprising said communicating means.

16. An apparatus as claimed in claim 15, wherein said third interior wall has a lower edge portion which is bent inwardly toward said third compartment and which extends in a direction substantially parallel with a second of said inclined exterior walls.

17. An apparatus as claimed in claim 1, wherein said collecting means comprises at least one perforated decanted water collector extending across said third compartment at a position above said inclined hollow tubes, said collecting means being mounted to said tank by a quick-coupling connection.

* * * * *